United States Patent
Menzler et al.

(10) Patent No.: US 7,381,552 B2
(45) Date of Patent: Jun. 3, 2008

(54) MACROPOROUS MATERIAL IN THE FORM OF PLASTIC PEARLS

(75) Inventors: Stefan Menzler, Darmstadt (DE); Hans-Ulrich Petereit, Darmstadt (DE); Christian Meier, Darmstadt (DE); Thomas Boller, Darmstadt (DE); Thomas Suefke, Erzhausen (DE); Klaus Schultes, Wiesbaden (DE); Roger Recktenwald, Bensheim (DE)

(73) Assignee: Roehm GmbH & Co. KG, Darmstadt (DE)

( * ) Notice: Subject to any disclaimer, the term of this patent is extended or adjusted under 35 U.S.C. 154(b) by 380 days.

(21) Appl. No.: 10/498,971

(22) PCT Filed: Aug. 25, 2003

(86) PCT No.: PCT/EP03/09378

§ 371 (c)(1),
(2), (4) Date: Nov. 10, 2004

(87) PCT Pub. No.: WO2004/039854

PCT Pub. Date: May 13, 2004

(65) Prior Publication Data

US 2005/0065224 A1  Mar. 24, 2005

(30) Foreign Application Priority Data

Oct. 31, 2002  (DE) ................... 102 51 144

(51) Int. Cl.
  *C12N 11/08*  (2006.01)
  *G01N 33/545*  (2006.01)
  *C07K 17/08*  (2006.01)

(52) U.S. Cl. ............. 435/180; 436/531; 530/815
(58) Field of Classification Search ............. None
  See application file for complete search history.

(56) References Cited

U.S. PATENT DOCUMENTS

| | | | | |
|---|---|---|---|---|
| 5,658,769 A | * | 8/1997 | Bosley et al. | 435/135 |
| 6,048,908 A | * | 4/2000 | Kitagawa | 521/56 |
| 7,011,963 B1 | * | 3/2006 | Meier et al. | 435/180 |
| 2005/0084925 A1 | | 4/2005 | Menzler et al. | 435/47 |

FOREIGN PATENT DOCUMENTS

WO   WO 66/40122   *   8/1999

OTHER PUBLICATIONS

U.S. Appl. No. 11/719,969, filed May 23, 2007, Menzler et al.
U.S. Appl. No. 10/498,971, filed Nov. 10, 2004, Menzler et al.
U.S. Appl. No. 10/501,140, filed Jul. 13, 2004, Menzler et al.

* cited by examiner

*Primary Examiner*—David M. Naff
(74) *Attorney, Agent, or Firm*—Oblon, Spivak, McClelland, Maier & Neustadt, P.C.

(57) ABSTRACT

The invention relates to a macroporous plastics bead material with an average particle diameter from 10 to 1000 µm, containing a copolymer of a) 5-60 wt. % vinylically polymerizable monomers with a water solubility of at least 1% at 20° C., b) 1-40 wt. % vinylically polymerizable monomers with an additional functional group, which can enter into covalent bonds with the nucleophilic groups of the ligands in a polymer-like reaction, c) 10-40 wt. % hydrophilic, crosslinking radical-polymerizable monomers with two or more ethylenically unsaturated polymerizable groups and d) 10-60 wt. % vinylically polymerizable monomers with a water solubility of at most 1% at 20° C. are contained, as a rule with the monomers a) to d) adding up to 100%.

11 Claims, No Drawings

MACROPOROUS MATERIAL IN THE FORM OF PLASTIC PEARLS

The invention relates to the field of polymeric support systems and in particular a macroporous plastics bead material containing a copolymer of crosslinked (meth)acrylate plastic.

PRIOR ART

Polymeric support systems containing copolymers of crosslinked (meth)acrylate plastic are known, e.g. from EP-A 0 328767, EP-A 424 130, EP-A 579 928 or from WO 99/33964.

WO 99/40122 (DE-A 19804518) relates to a method of production of a bead-like, crosslinked hydrophilic copolymer with binding activity with respect to ligands with nucleophilic groups, by inverse suspension polymerization of a monomeric phase. The invention further relates to the polymeric support materials obtainable therefrom, with high binding capacity for penicillin amidase and a low swelling index, and their uses.

The copolymer of crosslinked (meth)acrylate plastic is obtained by inverse suspension polymerization of the following monomers:
a) 5-40 wt. % hydrophilic radical-polymerizable monomers with a vinyl group, which form at least 10% aqueous solutions at room temperature
b) 30-50 wt. % radical-polymerizable monomers with a vinyl group and an additional functional group which, in a polymer-like reaction, can enter into covalent bonds with the nucleophilic groups of the ligands
c) 20-60 wt. % hydrophilic, crosslinking radical-polymerizable monomers with two or more ethylenically unsaturated polymerizable groups The copolymer is suitable as support material for various types of enzymes.

OBJECT AND SOLUTION

On the basis of WO 99/40122, other macroporous plastics bead materials were to be prepared, which are suitable as efficient support materials especially for enzymes that are able to convert relatively hydrophobic substrates, preferably for lipases. If possible, the advantageous properties of the known materials according to WO 99/40122, e.g. their low swelling indices, were not to be impaired. Furthermore, macroporous plastics bead materials were to be prepared which, after binding of lipases, display comparatively high activities in test systems such as tributyrin hydrolysis, triacetin hydrolysis, phenyl ethyl acetate hydrolysis and/or phenyl ethyl acetate synthesis.

The object is achieved by means of a macroporous plastics bead material with an average particle diameter in the range from 10 to 1000 μm, containing a copolymer of
a) 5-60 wt. % vinylically polymerizable monomers with a water solubility of at least 1% at 20° C.,
b) 1-40 wt. % vinylically polymerizable monomers with an additional functional group, which can enter into covalent bonds in a reaction with nucleophilic groups of ligands,
c) 10-40 wt. % hydrophilic, crosslinking radical-polymerizable monomers with two or more ethylenically unsaturated polymerizable groups, characterized in that, additionally,
d) 10-60 wt. % vinylically polymerizable monomers with a water solubility of at most 1% at 20° C. are contained, with the monomers a) to d) as a rule adding up to 100%.

IMPLEMENTATION OF THE INVENTION

Average Particle Diameter $V_{50}$

The macroporous plastics bead material has an average particle daimeter $V_{50}$ from 10 to 1000, preferably from 50 to 600, particularly preferably from 100 to 500, and especially frim 200 to 400 μm.

The average particle diameter $V_{50}$ can be determined for example with a particle analyzer. For this, as a rule a little detergent is added as wetting agent to a sample with a particle concentration in the range $10^3$-$10^6$, additionally treating with ultrasound prior to measurement in order to seperate the particles.

Porosity

The macroporous plastics bead material can have a porosity that can be characterized by a $K_{PS10}$ value from 0.3 to 0.9, especially from 0.35 to 0.6, which can be measured e.g. by means of reverse size-exclusion chromatography in tetrahydrofuran.

Swelling Index in Water

The macroporous plastics bead material can have a swelling index in water from 1 to 1.5, especially from 1.05 to 1.2.

Monomer Composition

The copolymer consists according to the invention of the radical-polymerized units of monomer types a) to d), which are in the stated quantitative proportions and as a rule add up to 100 wt. %. The ability to convert hydrophobic substrates is determined essentially by the actual choice of monomers and their quantitative proportions. In particular the balance of the more hydrophilic monomer types a) and the more hydrophobic monomer types d) seems to have an important influence on the conversion of hydrophobic substrates.

The enzyme binding property is influenced in particular by the choice and the proportion of monomer type b). Monomer type c) influences, as crosslinking agent, the size and porosity of the plastics beads. The size and porosity, in their turn, influence the binding capacity for enzymes and their catalytic behavior in the bound state.

It will be evident to a person skilled in the art that the copolymers can also contain small proportions of other vinylically polymerizable monomers, without this necessarily impairing their essential properties in an individual case. As a rule, however, the copolymers consist to 100% of radical-polymerized units the monomers a) to d).

Monomers a)

5-60, preferably 10 to 50 wt. % vinylically polymerizable monomers with a water solubility of at least 1% at 20° C. are contained as monomers a) in the copolymer.

The following are suitable in particular as monomers a): acrylamide and/or methacrylamide, hydroxyalkyl esters of unsaturated polymerizable carboxylic acids, such as hydroxyethyl acrylate, hydroxyethyl methacrylate, hydroxypropyl acrylate, and hydroxypropyl methacrylate. Also suitable are for example N-vinyl pyrrolidone, methyl methacrylate or 3-allyloxy-1,2-propanediol. Methyl methacrylate and methoxypolyethyleneglycol methacrylate (MPEGMA), polyethyleneglycol methacrylate (PEGMA) are preferred, especially methoxypolyethyleneglycol methacrylate 350 (MPEGMA350) and polyethyleneglycol methacrylate (PEGMA).

Good results are obtained in particular when the copolymer contains methoxypolyethyleneglycol methacrylate, e.g. MPEGMA350, and methyl methacrylate simultaneously. In total, it can contain e.g. 30 to 45 wt. % of the two monomers.

Monomers b)

1-40, preferably 10 to 30 wt. % vinylically polymerizable monomers, which are provided with an additional functional group, preferably an oxirane group (epoxy group), which can enter into covalent bonds in a reaction with nucleophilic groups of ligands, are contained as monomers b).

The term ligands preferably means biologically active molecules, especially macromolecules, e.g. amino acids, peptides, proteins, especially enzymes such as lipases, but also nucleic acids or polysaccharides. In particular oxirane groups are suitable, for binding ligands while preserving their biological activity.

Suitable monomers b) are glycidyl methacrylate and/or allylglycidyl ether and/or vinylazlactone.

Glycidyl methacrylate is preferred, and is especially preferred in an amount from 15 to 25 wt. %.

Monomers c)

10-40, preferably 20 to 35 wt. % of hydrophilic, crosslinking, radical-polymerizable monomers with two or more ethylenically unsaturated polymerizable groups are contained as monomers c).

Those that are suitable are e.g. hydrophilic di(meth)acrylates, such as ethyleneglycol-di(meth)acrylate and polyethylene-oxide-di(meth)acrylates. Other suitable monomers c) are N,N'-methylene-bis-acrylamide or N,N'-methylene-bis-methacrylamide.

The preferred monomer c) is 1,4-butanediol dimethacrylate.

Monomers d)

10-60, preferably 10 to 30 wt. % vinylically polymerizable monomers with a water solubility of at most 1% at 20° C. are contained as monomers d).

Suitable monomers d) are e.g. isobutyl methacrylate, n-butyl methacrylate, cyclohexyl methacrylate, benzyl methacrylate and 2-ethylhexyl methacrylate.

Method of Production

The macroporous plastics bead material consisting of the copolymers can be produced in a known way by suspension polymerization (bead polymerization). A stirred reactor is charged with an aqueous phase, which in particular contains distributors, e.g. precipitated aluminum hydroxide. The monomers are then added together with a polymerization initiator, e.g. dilauryl peroxide, in an organic phase, e.g. cyclohexane. The phases are dispersed with stirring, and polymerization of the monomers can take place e.g. in a temperature range from 60 to 80° C. The macroporous plastics bead material can be obtained from the charge by filtration and drying.

Variants of the Copolymers/Test Systems

Variants of the copolymers on which the enzyme lipase from Candida antarctica was immobilized should show good results in the following test systems. The enzyme can be immobilized e.g. by incubation of the macroporous plastics bead material with a commercial enzyme solution (e.g. Novozym® 525F) in aqueous solution for 1 to 2 days at room temperature. Then the plastics bead material coupled to the enzyme is washed and dried. The immobilizates thus obtained can be tested in the following test systems.

Hydrolysis of tributyrin (aqueous system and water-soluble substrate). The immobilizate of macroporous plastics bead material and lipase from Candida antarctica can for example have a tributyrin-hydrolysis activity of at least 150 [U/g], preferably at least 300 [U/g], especially of at least 500 [U/g].

Hydrolysis of triacetin (aqueous system, water-insoluble substrate). The immobilizate of macroporous plastics bead material and lipase from Candida antarctica can for example have a triacetin-hydrolysis activity of at least 50 [U/g], preferably at least 100 [U/g], especially of at least 150 [U/g].

Hydrolytic racemate cleavage of 1-phenylethyl acetate (aqueous system, water-insoluble substrate). The immobilizate of macroporous plastics bead material and lipase from Candida antarctica can for example have a phenylethyl acetate-hydrolysis activity of at least 80 [U/g], preferably at least 100 [U/g], and especially of at least 150 [U/g].

Racemate cleavage of 1-phenylethanol by transesterification (nonaqueous system). The immobilizate of copolymer and lipase from Candida antarctica can for example have a phenylethanol-racemate cleavage activity of at least 100 [U/g], preferably at least 120 [U/g], and especially of at least 180 [U/g].

Uses

The macroporous plastics bead material can be used for immobilizing peptides, proteins, nucleic acids or polysaccharides, preferably for immobilizing lipases from Rhizopus, Aspergillus, Mucor, Alcaligenes, Candida, Pseudomonas, Thermomyces, Chromobacterium, pig pancreas, and for immobilizing phospholipases from Streptomyces and Actinomadura, as well as for immobilizing esterases from pig's liver and orange-peel.

The macroporous plastics bead materials according to the invention can be used as support materials for covalent bonding of ligands by means of the oxirane groups that are present, in stirred or flow reactors. This can take place e.g. by deposition of proteins, especially enzymes, from concentrated solutions via covalent bonding, preserving their biological activity. Furthermore, it is also possible for peptides, amino acids, lipids, nucleotides, polynucleotides, low-molecular nucleophilic compounds or organometallic compounds to be converted with the oxirane groups of the support beads.

The polymer beads laden with ligands can be used in a known way for stereospecific synthesis of chiral substances, such as amino acids (d-phenylalamine, p-hydroxy-d-phenylalanine, 1-tert-leucine) or pharmaceuticals, e.g. β-lactam antibiotics, ibuprofen.

Another area of application includes syntheses of fine chemicals or basic products for chemical syntheses (e.g. malic acid). The polymer beads can also be used in separation technology for adsorption chromatography or gel-permeation chromatography. For specific adsorption, the polymer beads can be loaded with immunoglobulin fractions from antisera or with monoclonal antibodies.

Another field of application is the use of the polymeric support material laden with enzymes or antibodies as an adsorbent in extracorporeal therapy, in which pathogenic or toxic substances are removed from whole blood.

EXAMPLES

1. Examples of Copolymer Variants

Synoptic table of the copolymer variants

| Monomer type | Monomer | \multicolumn{10}{c}{Copolymer variants No. + Proportion of monomer, wt. %} |
|---|---|---|---|---|---|---|---|---|---|---|---|
| | | 13 | 60 | 66 | 61 | 67 | 15 | 27 | 30 | 37 | 39 |
| a) | Methyl methacrylate | 27.5 | 20.0 | 17.5 | 15.0 | 12.5 | 22.5 | 27.5 | 22.5 | 25.0 | 25.0 |
| | MPEGMA350 | | 15.0 | 20.0 | 25.0 | 30.0 | | | | | |
| | 3-Allyloxy-1,2-propanediol | | | | | | 10 | | | | |
| | Hydroxyethyl methacrylate | | | | | | | | 10 | | |
| b) | Glycidyl methacrylate | 20.0 | 20.0 | 20.0 | 20.0 | 20.0 | 20.0 | 20.0 | 20.0 | 20.0 | 20.0 |
| c) | 1,4-Butanediol dimethacrylate | 25.0 | 25.0 | 25.0 | 25.0 | 25.0 | 25.0 | 25.0 | 25.0 | 30.0 | 30.0 |
| d) | Isobutyl methacrylate | 27.5 | 20.0 | 17.5 | 15.0 | 12.5 | 22.5 | | 22.5 | | |
| | Cyclohexyl methacrylate | | | | | | | | | 25.0 | |
| | Benzyl methacrylate | | | | | | | 27.5 | | | |
| | 2-Ethylhexyl methacrylate | | | | | | | | | | 25.0 |

MPEGMA350 = Methoxypolyethyleneglycol methacrylate 350

Example 1

Production Instructions for Copolymer Variant 13

Proportions of the Phases:
Water:monomer (+solvent)=2:1 (can be varied), e.g. 1:1 or 1:2.
Monomers:solvent=2:1 (can be varied), e.g. 1:1 or 1:2

The whole amount of water [810 g] and the aluminum sulfate [5.4 g] are placed in a 2 liter stirred reactor, comprising thermocouple, bath thermostat, reflux condenser, and nitrogen inlet pipe, with stirring and nitrogen feed, and heated to 70° C. When the specified internal temperature is reached, the soda solution [24 g] is added in one go for precipitating the aluminum hydroxide. Then the auxiliary distributors are added: C15-paraffin sulfonate, sodium salt and polyethyleneglycol 5000/6000 [0.05 g each]. The pH value of the aqueous phase is approx. 5.5.

Then
- 74 g isobutyl methacrylate,
- 74 g methyl methacrylate,
- 54 g glycidyl methacrylate,
- 67.5 g 1,4-butanediol dimethacrylate and
- 5.4 g dilauroyl peroxide, dissolved in 135 g cyclohexane, are added. In the next 20 minutes the internal temperature rises from 70° C. to 72° C. After the temperature maximum, heating continues at 70° C. for a further 2 hours. Then it is cooled to 40° C. and acidified with 10 ml of 50% sulfuric acid. The charge is cooled further, drained on a porcelain suction filter (cloth filter) and washed with 5 L deionized H₂O. The moist beads are dried in a fluidized-bed dryer at 50-60° C. for 90 minutes.

Example 2

Production Instructions for Copolymer Variant 60

The whole amount of water [810 g] and the aluminum sulfate [5.4 g] are placed in a 2 liter stirred reactor, comprising thermocouple, bath thermostat, reflux condenser, and nitrogen inlet pipe, with stirring and nitrogen feed, and heated to 70° C. When the specified internal temperature is reached, the soda solution [24 g] is added in one go for precipitating the aluminum hydroxide. Then the auxiliary distributors are added: C15-paraffin sulfonate, sodium salt and polyethyleneglycol 5000/6000 [0.05 g each]. The pH value of the aqueous phase is approx. 5.5.

Then
- 54 g isobutyl methacrylate,
- 54 g methyl methacrylate,
- 54 g glycidyl methacrylate,
- 67.5 g 1,4-butanediol dimethacrylate
- 40.5 g methoxypolyethyleneglycol methacrylate and
- 5.4 g dilauroyl peroxide, dissolved in 135 g cyclohexane, are added. In the next 20 minutes the internal temperature rises from 70° C. to 72° C. After the temperature maximum, heating continues at 70° C. for a further 2 hours. Then it is cooled to 40° C. and acidified with 10 ml of 50% sulfuric acid. The charge is cooled further, drained on a porcelain suction filter (cloth filter) and washed with 5 L deionized H₂O. The moist beads are dried in a fluidized-bed dryer at 50-60° C. for 90 minutes.

Example 3

Polymer Analysis of the Copolymer Variants

| Variant No. | $V_{50}$ [μm] | $K_{PS10}$ value | Swelling index |
|---|---|---|---|
| 13 | 356 | 0.46 | 1 |
| 60 | 227 | 0.51 | 1 |
| 66 | 243 | 0.51 | 1 |
| 61 | 294 | 0.52 | 1.1 |
| 67 | 269 | 0.53 | 1.1 |
| 15 | 340 | 0.52 | 1.1 |
| 27 | 384 | 0.51 | 1 |
| 30 | 316 | 0.56 | 1.1 |
| 37 | 392 | 0.55 | 1 |
| 39 | 388 | 0.4 | 1 |

Determination of the Average Particle Diameter $V_{50}$:

The average particle diameter is measured with a CIS1 particle analyzer from the company L.O.T. GmbH. Sample preparation: a sufficient amount of the sample is placed in a 400 ml glass beaker to give a concentration of $10^3$-$10^6$ particles. Then a few drops of a detergent are added to the sample to aid wetting. Then it is topped up with 350 ml of fully deionized water. The suspension obtained is treated with ultrasound for approx. 1 minute and then measurements are taken in the CIS1 instrument, measurement range 5-600 µm.

Determination of the Distribution Coefficient $K_{PS10}$:

Using reverse size-exclusion chromatography (SEC), the proportion of the pore volume accessible to the probe molecule employed is determined. The distribution coefficient thus obtained is a measure of the porosity of the sample. A Merck Superformance glass column 300×10 mm is filled according to the balanced density principle with THF and tetrachloroethylene with the bead polymer. Then the column is packed and equilibrated, by supplying 150 ml THF at a flow rate of 15 ml/min. Then the column is sealed and a further 150 ml tetrahydrofuran (THF) is supplied at a flow rate of 10 ml/min. Pressures>20 bar are to be avoided, as the column is then compressed too much and suitable column packing cannot be achieved. Then the probe molecules are supplied to the column successively and eluted at a flow rate of 0.2 ml/min. The exclusion limits are determined with o-dichlorobenzene and polystyrene 6770000 (molecular weight 6770000 dalton), with polystyrene 10200 (molecular weight 10200 dalton) as probe molecule.

The distribution coefficient is calculated from the elution volumes as follows:

$$K_{PS10}=V_{E(PS10200)}-V_{E(PS6770000)}/V_{E(o-dichlorobenzene)}-V_{E(PS6770000)}$$

where:

$K_{PS10}$=distribution coefficient for polystyrene 10200, $V_{E(PS10200)}$=elution volume of the probe molecule polystyrene 10200, $V_{E(PS6770000)}$=elution volume of the exclusion marker polystyrene 6770000, $V_{E(o-dichlorobenzene)}$=elution volume of the exclusion marker o-dichlorobenzene.

Determination of the Swelling Index:

3 g of support are weighed in a 25 ml graduated cylinder with 0.5 ml divisions. The surface is leveled by light tamping of the graduated cylinder and the filled volume $V_T$ in ml is noted. Next, 9 ml of 0.01% Polysorbate 80 solution in ultrafiltered water is added and the graduated cylinder is sealed. Within the space of one hour, the graduated cylinder is shaken vigorously four times, at 15 minute intervals. Then beads adhering to the wall are rinsed down with 2 to 3 ml of 0.01% Polysorbate 80 solution in ultrafiltered water. The graduated cylinder is left still for 2 hours, then the volume of the settled and of the floating material is read and added to $V_Q$. The swelling index is defined as the ratio $V_Q/V_T$.

Example 4

Immobilization Methods

Method M2:

Add 4 ml of enzyme solution Novozym 525F to 16 ml of a 10 vol. % solution of tert-amyl alcohol in distilled water. Add this solution to 2 g of dry support. Swirl the preparation at 20° C. for 1.5 d. Then rinse the beads onto a Por 2 glass frit and wash with 6×50 ml distilled water. After the last rinse, filter with strong suction. Dry over xerogel in a desiccator.

Method M3:

Mix 4 ml of enzyme solution Novozym 525F and 6 ml of ultrapure water. Add the mixture to 2 g of dry support. Swirl, then shake while inverted at room temperature for 1.5 d. Then rinse the beads onto a Por 2 glass frit and wash with 3×50 ml distilled water and 3×50 ml 0.1M potassium phosphate buffer pH 7.5. After the last washing, filter with strong suction and dry over xerogel in a desiccator.

Method M3-aMEK:

Mix 4 ml of enzyme solution Novozym 525F and 6 ml of ultrapure water. Add the mixture to 2 g of dry support. Swirl, then shake while inverted at room temperature for 1.5 d. Then rinse the beads onto a Por 2 glass frit and wash with 6×50 ml distilled water. For drying, filter with strong suction and wash chromatographically with 6×50 ml methyl ethyl ketone (MEK) on the glass frit, then filter with suction until dry (approx. 30 min). Instead of MEK it is possible to use other, partially or completely water-miscible solvents such as THF, tert-amyl alcohol, isopropanol, and acetone.

Method M4:

Mix 4 ml of enzyme solution Novozym 525F and 6 ml of 1M potassium phosphate buffer pH 7.5. Add the mixture to 2 g of dry support. Swirl, then leave to stand at 23° C. for 1.5 d. Then rinse the beads onto a Por 2 glass frit and wash with 3×50 ml distilled water and 3×50 ml 0.1M potassium phosphate buffer pH 7.5. After the last rinse, filter with strong suction. Dry over xerogel in a desiccator.

Example 5

Activity Tests 5.1 Tributyrin Hydrolysis

In the activity test, the release of butyric acid is measured by titration with 1M NaOH solution in conditions of constant pH.

Equipment:

pH-stat Titrator, e.g. Mettler DL 50

100 ml glass vessel (similar to the standard vessel from Mettler-Toledo)

pH electrode DG-111-SC 10 ml burette

Mettler propeller stirrer, speed 80%

Preparation Size:

48.5 ml buffer pH 7.0 Fluka 82571

5 mmol tributyrin (100 mM)

50 mg enzyme immobilizate

Procedure:

1.47 ml (5 mmol) of tributyrin were emulsified in 48.5 ml of 0.5 M phosphate buffer pH 7.0 using a propeller stirrer for 5 min at room temperature. The pH value of the emulsion was adjusted to pH 7.0 by adding 1M sodium hydroxide solution (pre-titration). Then 50 mg of immobilizate is added, starting the reaction. The connected titrator records the consumption of sodium hydroxide solution as a function of the hydrolysis time. The activity of the enzyme is determined from the linear slope of the curve. The activity in U/g immobilizate can be calculated directly from the value obtained from that in ml/min per amount of enzyme used.

5.2 Triacetin Hydrolysis

In the activity test, the release of acetic acid is measured by titration with 0.1 M NaOH solution in conditions of constant pH.

Equipment:
pH-stat Titrator, e.g. Schott Titroline Alpha
100 ml double-jacketed glass vessel
Water bath with thermostatic control
Radiometer TTA 80 stirrer stand
pH electrode Schott Blue Line
10 ml burette Preparation Size:
16 ml 0.05M potassium phosphate buffer pH 7.0
400 µl Triacetin Merck No. 108238
100 mg enzyme immobilizate Procedure:

The reaction vessel is thermostated to 25° C. It is charged with 16 ml of 0.05M potassium phosphate buffer pH 7.0, and 100 mg of the immobilizate to be investigated is added. Then stirring is started. Reaction is initiated by adding 400 µl triacetin. The connected titrator records the consumption of sodium hydroxide solution as a function of the hydrolysis time. The activity of the enzyme is determined from the linear slope of the curve. The activity in U/g immobilizate can be calculated directly from the value obtained from that in ml NaOH/min per amount of enzyme used.

5.3 Phenyl Ethyl Acetate Hydrolysis

In the activity test, the release of acetic acid from (±)-1-phenyl ethyl acetate is measured by titration with 1M NaOH solution in conditions of constant pH.

Equipment:
pH-stat Titrator, e.g. Mettler DL 50
25 ml semimicro vessel made of glass (standard vessel from Mettler-Toledo)
Micro-pH electrode Mettler N 6000 A
5 ml burette
Mettler micro-propeller stirrer, speed 100%

Preparation Size:
19.2 ml buffer pH 7.0 Fluka 82571
5 mmol (±)-1-phenyl ethyl acetate (250 mM)
100 mg enzyme immobilizate Procedure:

800 µl (5 mmol) of (±)-1-phenyl ethyl acetate was emulsified for 5 min at room temperature in 19.2 ml of 0.5 M phosphate buffer pH 7.0 using a micro-propeller stirrer. The pH value of the emulsion was adjusted to pH 7.0 by adding 1 M sodium hydroxide solution (pre-titration). Then 100 mg of immobilizate is added, starting the reaction. The connected titrator records the consumption of sodium hydroxide solution as a function of the hydrolysis time. The activity of the enzyme is determined from the linear slope of the curve. The activity in U/g immobilizate can be calculated directly from the value obtained from that in ml/min per amount of enzyme used.

After approx. 50% conversion of the acetate, the reaction is stopped, the enzyme is filtered off and then washed with methyl-tert-butyl ether (MTBE). The hydrolyzate is extracted with MTBE three times and the organic phases are combined and dried over $MgSO_4$ and the solvent is concentrated by a rotary evaporator. The conversion and the enantiomer excesses for educt and product are determined in the residue by HPLC on a chiral column (Daicel Chiralcel OD-H).

HPLC Method:
Coating: hexane: t-butanol 98.0:2.0
Flow 0.5 ml/min>1.0 ml/min
Detection 254 nm
Column furnace temp. 20° C.
(±)-1-Phenyl ethyl acetate (R) or (S)Rt=11.1 min; Rt=11.9 min
Phenylacetone Rt=14.9 min
(±)-1-Phenylethanol (R) or (S)Rt=25.6 min; Rt=39.1 min 5.4 Phenyl Ethyl Acetate Synthesis The esterification of (±)-1-phenylethanol with vinyl acetate to (R)-1-phenyl ethyl acetate is determined. The progress of the reaction is determined by HPLC, in which the synthesis of (R)-1-phenyl ethyl acetate and the decrease in (R)-1-phenylethanol are observed. The specific activity of the enzyme is then calculated from the slope of the synthesis curve.

Equipment:
25 ml and 10 ml screw-cap glass vessels
Ika orbital shaker (500 rpm)

Preparation Size:
20 ml and 8 ml MTBE
2 mmol and 0.8 mmol (±)-1-phenylethanol
6 mmol and 2.4 mmol vinyl acetate
50 mg enzyme immobilizate Procedure:

0.8 mmol (±)-1-phenylethanol and 2.4 mmol vinyl acetate were shaken on an orbital shaker at 500 rpm in 8 ml MTBE in 10 ml screw-cap glass vessels at 40° C. reaction temperature. In defined time intervals of 10 min, 20 µl samples were taken up to the first hour, 400 µl acetonitrile was added and analysis was carried out on an HPLC column. The conversion for determination of enzyme activity is determined on an RP-18-HPLC column (column Lichrosphere RP-18 (250 mm×5 µm), water:acetonitrile 50:50, flow 0.5 ml; 254 nm; room temperature). The enantiomer excess is determined by HPLC on a chiral phase (Daicel Chiralcel OD-H). For HPLC method, see above.

Example 6

Activity of the Immobilizates

TABLE A

Examples of polymer supports made according to the invention, immobilization method M3-aMEK.

| Copolymer No. | Immobilization method | Tributyrin activity [U/g] | Triacetin activity [U/g] | PEAc-Hyd. activity [U/g] | PEAc-Syn. activity [U/g] |
|---|---|---|---|---|---|
| 13 | M3-aMEK | 463 | 96 | 106 | 184 |
| 60 | M3-aMEK | 861 | 172 | 183 | 184 |
| 66 | M3-aMEK | 793 | 192 | 101 | 159 |
| 61 | M3-aMEK | 457 | 114 | 82 | 189 |
| 67 | M3-aMEK | 188 | 55 | 19 | 198 |

For the two columns on the right: enantiomeric purity of the products in all cases >99% ee.

TABLE B

Examples of polymer supports made according to the invention, immobilization method M2.

| Copolymer No. | Immobilization method | Tributyrin activity [U/g] | Triacetin activity [U/g] | PEAc-Hyd. activity [U/g] | PEAc-Syn. activity [U/g] |
|---|---|---|---|---|---|
| 13 | M2 | 345 | n.d. | 136 | 85 |
| 15 | M2 | 369 | n.d. | 114 | 97 |
| 27 | M2 | 282 | n.d. | 66 | 72 |
| 30 | M2 | 281 | n.d. | 73 | 82 |
| 37 | M2 | 401 | n.d. | 93 | 86 |
| 39 | M2 | 270 | n.d. | 126 | 110 | n.d. = not determined

For the two columns on the right: enantiomeric purity of the products in all cases >99% ee.

TABLE C

Comparative examples (immobilization methods M3 and M4).

| Polymer | Immobilization method | Tributyrin activity [U/g] | Triacetin activity [U/g] | PEAc-Hyd. activity [U/g] | PEAc-Syn. activity [U/g] |
|---|---|---|---|---|---|
| A | M3 | 23 |  | 19 | 1 |
| A | M4 | 48 | 85 | 6 | 1 |
| B | M3 | 55 | 40 | 54 | 59 |
| B | M4 | 114 | 203 | 171 | 22 |
| C | M3 | 70 |  | 44 | 6 |
| C | M4 |  | 155 |  |  |

For the two columns on the right: enantiomeric purity of the products in all cases >99% ee.

Polymer A: Commercially available macroporous crosslinked plastics bead material consisting of
  10 wt. % methacrylamide
  20 wt. % glycidyl methacrylate
  20 wt. % allyl glycidyl ether
  50 wt. % N,N'-methylene-bis-methacrylamide, Polymer B: Commercially available macroporous crosslinked plastics bead material consisting of
  30 wt. % methacrylamide
  20 wt. % glycidyl methacrylate
  20 wt. % allyl glycidyl ether
  30 wt. % N,N'-methylene-bis-methacrylamide, Polymer C corresponds to polymer A in the monomer composition, but has a lower swelling index (<1.5) (production according to DE-A 19804518).

The invention claimed is:

1. A macroporous plastics bead material with an average particle diameter from 10 to 1000 μm, comprising a copolymer of:
   a) 5-60 wt. % vinylically polymerizable monomers with a water solubility of at least 1% at 20° C. selected from the group consisting of acrylamide, methacrylamide, hydroxyalkyl esters of unsaturated polymerizable carboxylic acids, N-vinylpyrrolidone, methyl methacrylate, 3-allyloxy-1,2-propanediol, methoxypolyethyleneglycol methacrylate and polyethyleneglycol methacrylate,
   b) 1-40 wt. % vinylically polymerizable monomers with an additional functional group, which can enter into covalent bonds in a reaction with nucleophilic groups of ligands,
   c) 10-40 wt. % hydrophilic, crosslinking radical-polymerizable monomers with two or more ethylenically unsaturated polymerizable groups, and
   d) 10-60 wt .% vinylically polymerizable monomers with a water solubility of at most 1% at 20° C. selected from the group consisting of isobutyl methacrylate, n-butyl methacrylate, cyclohexyl methacrylate, benzyl methacrylate and 2-ethylhexyl methacrylate, wherein the wt. % of monomers a) to d) add up to 100%.

2. The macroporous plastics bead material as claimed in claim 1, wherein the macroporous plastics bead material has a $K_{PS10}$ porosity value of said macroporous plastics bead material is 0.3 to 0.9 as measured by reverse size-exclusion chromatography in tetrahydrofuran.

3. The macroporous plastics bead material as claimed in claim 1, wherein the macroporous plastics bead material has a swelling index in water of 1 to 1.5.

4. The macroporous plastics bead material as claimed in claim 1, wherein said vinylically polymerizable monomer (a) is selected from the group consisting of methoxypolyethyleneglycol methacrylate and methyl methacrylate.

5. The macroporous plastics bead material as claimed in claim 1, further comprising immobilized lipase from *Candida antarctica* having a tributyrin-hydrolysis activity of at least 150 [U/g].

6. The macroporous plastics bead material as claimed in claim 1, further comprising immobilized lipase from *Candida antarctica* having a phenyl ethyl acetate-hydrolysis activity of at least 80 [U/g].

7. The macroporous plastics bead material as claimed in claim 1, further comprising immobilized lipase from *Candida antarctica* having a phenylethanol-racemate cleavage activity of at least 100 [U/g].

8. A method for production of the macroporous plastics bead material as claimed in claim 1 comprising providing a monomer combination of:
   a) 5-60 wt. % vinylically polymerizable monomers with a water solubility of at least 1% at 20° C. selected from the group consisting of acrylamide, methacrylamide, hydroxyalkyl esters of unsaturated polymerizable carboxylic acids, N-vinylpyrrolidone, methyl methacrylate, 3-allyloxy-1,2-propanediol, methoxypolyethyleneglycol methacrylate and polyethyleneglycol methacrylate,
   b) 1-40 wt. % vinylically polymerizable monomers with an additional functional group, which can enter into covalent bonds in a reaction with nucleophilic groups of ligands,
   c) 10-40 wt. % hydrophilic, crosslinking radical-polymerizable monomers with two or more ethylenically unsaturated polymerizable groups, and
   d) 10-60 wt. % vinylically polymerizable monomers with a water solubility of at most 1% at 20° C. selected from the group consisting of isobutyl methacrylate, n-butyl methacrylate, cyclohexyl methacrylate, benzyl methacrylate and 2-ethylhexyl methacrylate, wherein the wt. % of monomers a) to d) add up to 100%, and
   suspension polymerizing said monomer combination in the presence of an initiator to obtain said macroporous plastics bead material.

9. A method for immobilizing ligands, comprising:
   covalently bonding ligands to said macroporous plastics bead material as claimed in claim 1.

10. The method of claim 9, wherein said ligand is a lipase.

11. The method of claim 9, wherein said ligands are selected from the group consisting of amino acids, peptides, proteins, enzymes, antibodies, nucleic acids, polysaccharides, and mixtures thereof.

* * * * *

UNITED STATES PATENT AND TRADEMARK OFFICE
CERTIFICATE OF CORRECTION

PATENT NO. : 7,381,552 B2
APPLICATION NO. : 10/498971
DATED : June 3, 2008
INVENTOR(S) : Stefan Menzler et al.

Page 1 of 1

It is certified that error appears in the above-identified patent and that said Letters Patent is hereby corrected as shown below:

Title Page, Item (54), and Col. 1, Line 1
"MACROPOROUS MATERIAL IN THE FORM OF PLASTIC PEARLS"

should read
-- MACROPOROUS MATERIAL IN THE FORM OF PLASTIC BEADS --.

Signed and Sealed this

Twenty-eighth Day of April, 2009

JOHN DOLL
*Acting Director of the United States Patent and Trademark Office*